United States Patent [19]

Mandeville

[11] Patent Number: 5,522,171
[45] Date of Patent: Jun. 4, 1996

[54] INSECT TRAP

[76] Inventor: J. David Mandeville, 1334 Oliver Ave., San Diego, Calif. 92109

[21] Appl. No.: 293,291

[22] Filed: Aug. 22, 1994

[51] Int. Cl.⁶ ........................................ A01M 1/00
[52] U.S. Cl. ........................................ 43/122; 43/107
[58] Field of Search ........................ 43/107, 122

[56] References Cited

U.S. PATENT DOCUMENTS

| | | | |
|---|---|---|---|
| 161,814 | 4/1875 | Nelson | 43/107 |
| 920,696 | 5/1909 | Turner | 43/107 |
| 1,085,701 | 2/1914 | Richman . | |
| 1,184,486 | 5/1916 | Myers | 43/107 |
| 1,900,199 | 3/1933 | Pickett | 43/107 |
| 2,014,500 | 9/1935 | Lass | 43/122 |
| 2,029,989 | 4/1936 | Driggers | 43/122 |
| 2,478,104 | 8/1949 | Johnson | 43/122 |
| 4,360,987 | 11/1982 | Lowder | 43/122 |
| 4,551,941 | 11/1985 | Schneidmiller | 43/107 |
| 4,794,724 | 1/1989 | Peters | 43/122 |
| 5,231,792 | 8/1993 | Warner | 43/122 |
| 5,339,563 | 8/1994 | Job | 43/122 |
| 5,393,560 | 2/1995 | Donahue | 43/107 |

FOREIGN PATENT DOCUMENTS

| | | | |
|---|---|---|---|
| 10641 | 4/1914 | United Kingdom | 43/122 |

*Primary Examiner*—Kurt Rowan
*Attorney, Agent, or Firm*—Henri J. A. Charmasson; John D. Buchaca

[57] ABSTRACT

An insect trap particularly adapted to capture flys and other flying pests is comprised of two symmetrical jars mounted in-line, face-to-face and joined by a cylindrical collar made of dark plastic. The collar is pierced along its median periphery with a plurality of entry ports, a frusto-conical barrier has a base flange captured between the collar and the upper, upside-down jar. Upon entering into the darkened collar section, the insect is immediately attracted by the lighted area above it constituted by the upper jar which it can only reach by flying through a restricted opening at the top of the frusto-conical barrier.

10 Claims, 1 Drawing Sheet

INSECT TRAP

FIELD OF THE INVENTION

This invention relates to insect traps and more particularly to traps adapted to collect flies and other flying pests.

BACKGROUND OF THE INVENTION

The state of the art at the time of the instant invention was best exemplified by the device disclosed in U.S. Pat. No. 4,551,941 Schneidmiller, specifically intended to capture wasps. This device uses a well-known trapping system consisting of a transparent container accessed through a circular truncated entry cone extending inside it from a lower entry port.

The prior designs of this type of insect trap has not been very effective in attracting and capturing a large portion of the surrounding insect population. The use of powerful attractants such as pheromones and decomposing organic matters have been very effective in gathering flying insects on or around the trap, only a relatively small proportion of those insects actually found their way into the trapping chamber.

Accordingly, there is a need for an improved insect trap of the type just described which quickly facilitates the entry of the insect without affecting the drawing power of the attracting material or limiting the capacity of its trapping container.

In order to be effective over a large area, insect traps must be used at multiple locations covering the full range of travel of the targeted species of insect. It is therefore imperative that the insect trap be inexpensive and either disposable or easily taken apart, emptied and cleaned.

SUMMARY OF THE INVENTION

The principal and secondary objects of the invention are to improve the efficiency of insect traps that use pheromones and other types of lures to incite the targeted insect to enter a trapping container through a concavely conical entry port, and to simplify the structure of such traps by reducing the complexity and number of its components, and by facilitating its disassembly and cleaning.

These and other objects are achieved by use of two jars mounted in-line, face-to-face in a vertical arrangement, and joined by a opaque and dark colored collar having peripheral entry ports. A frusto-conical trapping barrier installed between the collar and the inverted mouth of the upper jar constitutes the only other component of the trap.

The odor from an attractant contained in the bottom jar can only emanate through the peripheral entry ports of the collar. It has been found that the dark color of the collar stands in strong contrast with the transparent jars and offer an alluring target to the insects. Once the insect enters the collar, the opaque wall of the latter creates therein a clair-obscur zone against which the light coming through the upper jar and the transparent frusto-conical barrier urge the insect upward into the trapping chamber in response to their natural instinct to fly upwardly toward the sunlight.

DESCRIPTION OF THE PREFERRED EMBODIMENT OF THE INVENTION

Figure 1:
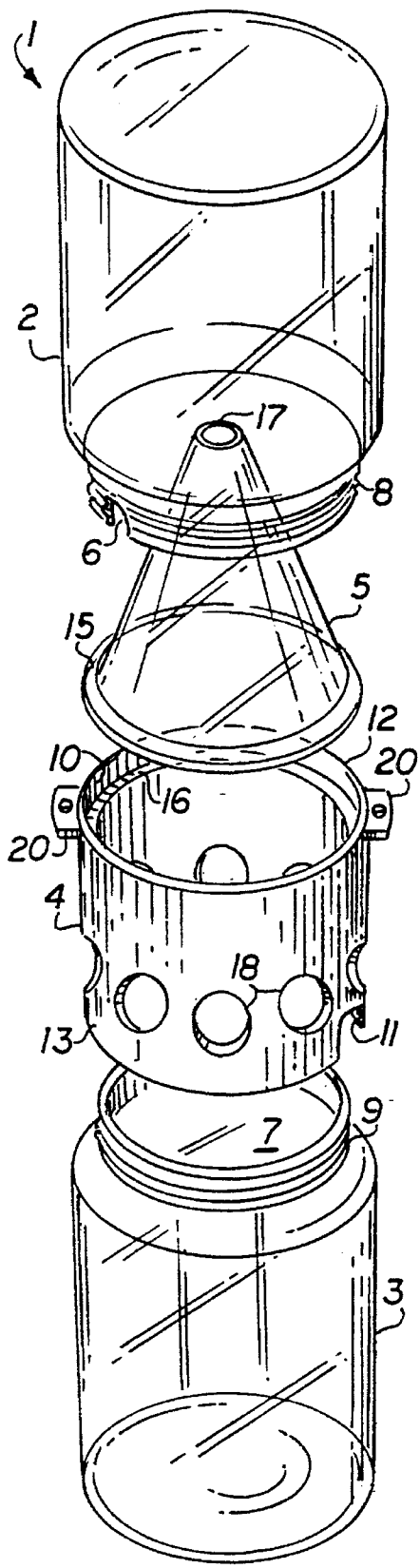
FIG. 1 is a perspective exploded view of an insect trap according to the invention.
Figure 2:
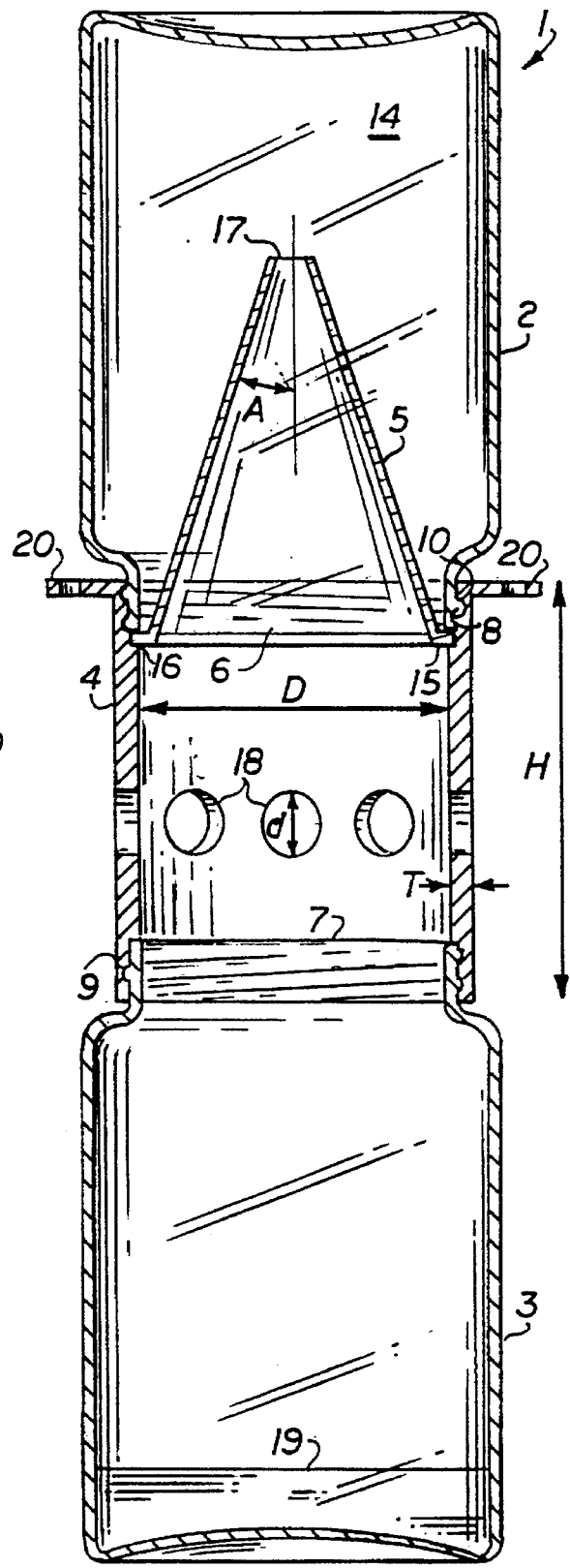
FIG. 2 is a cross-sectional view of a fully assembled version thereof.

The drawing illustrates an insect trap 1 intended to attract and capture one species of flies, specifically the common filthfly (Muscidae). The trap consists of only four components a first jar 2 for trapping the insect, a second jar 3 exactly similar to the first jar and designed to contain a lure, a collar 4 interconnecting the jars in an in-line, face-to-face configuration, and a frusto-conical barrier 5 inserted into the inverted aperture 6 of the top, trapping jar 2.

The aperture 6 of the trapping jar 2 and the opening 7 of the lure jar 3 are surrounded by male threads 8, 9 which mate with corresponding female threads 10, 11 in the inside surface of the upper rim 12 and lower rim 13 of the collar 4. The barrier 5 is preferably made of transparent plastic and extends into the upper half 14 of the trapping jar 2. A peripheral flange 15 extends radially and outwardly from the bottom edge of the barrier. The outer diameter of the flange is substantially similar to the outer diameter of the trapping jar brim. Accordingly, the flange is captured between the brim of the upper jar 2 and a ledge 16 at the base of the inner threaded section of the collar upper rim 12. The exit port 17 at the apex of the barrier is commensurate with the girth of an adult member of the species, i.e., approximately 8 millimeters. For maximum results the sloping angle A of the barrier in relationship to its axis should not be less than 15 degrees.

The collar 4 is made of an opaque plastic material, preferably black. A plurality of peripheral apertures 18 in the lower half section of the collar have a diameter d which is no greater than 0.2 time the height H of the collar. This height should be at least equal to 0.75 times the inner diameter D of the collar. These restrictions are necessary to create within the collar, a clair-obscur zone which contrasts with the bright area above it created by the transparent trapping jar 2 and barrier 5.

The lower jar 3 which holds an odoriferous attractant 19, may be made of transparent or of a light color material in order to maintain a striking contrast between the collar 4 and the other parts of the trap. A pair of ear-brackets 20 projecting outwardly from the upper rim 12 of the collar are used to suspend the lure. Ordinary canning jars having a mouth opening of 6 to 10 centimeters in diameter can be used to implement the preferred embodiment of the invention.

In order to facilitate entry of the insects into the trap, the spacing between the entry holes 18 should be approximately no more than their diameter d. The thickness T of the collar wall should be limited less than 1 centimeter so that the insect finds itself into the trap and sees the sunlight coming from the upper jar area as soon as it penetrates one of the holes 18.

While the preferred embodiments of the invention have been described, modifications can be made and other embodiments may be devised without departing from the spirit of the invention and the scope of the appended claims.

What is claimed is:

1. A trap for collecting at least one species of insects which comprises:

a lure container shaped and dimensioned to hold a substance attractive to said species, said container having a circular opening in an upper region thereof;

a trapping container having a substantially transparent wall and a circular aperture;

a collar joining said lure and trapping containers, said collar being made of an opaque material and having a peripheral wall, a lower rim and an upper rim;

means for detachably connecting said lower rim to said circular opening;

means for detachably attaching said upper rim to said aperture;

said peripheral wall having a dark-colored outer surface and at least one hole in said surface said hole being shaped and dimensioned to allow passage of said species therethrough; and a substantially frusto-conical barrier having a base entry port proximate said aperture, and a top exit port located within said trapping container, said exit port being substantially commensurate with one adult member of that species;

wherein said lure container and said trapping container are symmetrical;

wherein said upper and lower rims of said collar are circular and have substantially equal diameters; and said collar has a height equal to at least 0.75 times said diameter between said lower and upper rims.

2. The trap of claim 1, wherein said at least one hole is circular and has a diameter no greater than 0.2 times said height.

3. The trap of claim 2, wherein said collar is made from black material.

4. The trap of claim 2, wherein said trapping container comprises a first transparent jar.

5. The trap of claim 4, wherein said lure container comprises a second transparent jar.

6. The trap of claim 2, wherein said barrier is made of transparent material.

7. The trap of claim 1, wherein said barrier comprises a peripheral flange extending outwardly from said base, said flange being sized and dimensioned to nest within said upper rim about said aperture.

8. A trap for collecting at least one species of insects which comprises:

a lure container shaped and dimensioned to hold a substance attractive to said species, said container having a circular opening in an upper region thereof;

a trapping container having a substantially transparent wall and a circular aperture;

a collar joining said lure and trapping containers, said collar being made of an opaque material and having a peripheral wall, a lower rim and an upper rim;

means for detachably connecting said lower rim to said circular opening;

means for detachably attaching said upper rim to said aperture;

said peripheral wall having a dark-colored outer surface and at least one hole in said surface said hole being shaped and dimensioned to allow passage of said species therethrough; and a substantially frusto-conical barrier having a base entry port proximate said aperture, and a top exit port located within said trapping container, said exit port being substantially commensurate with one adult member of that species;

wherein;

said upper and lower rims of said collar are circular and have substantially equal diameters;

said collar has a height equal to at least 0.75 times said diameter between said lower and upper rims;

said at least one hole is circular and has a diameter no greater than 0.2 times said height;

said trapping container comprises a first transparent jar;

said lure container comprises a second transparent jar; and wherein said first and second transparent jars are symmetrical.

9. The trap of claim 8, wherein said jars have symmetrical threads around said opening and aperture.

10. The trap of claim 9, wherein said collar has identical threads about said lower and upper rims, said identical thread being sized to connectingly mate with said symmetrical threads.

* * * * *